US007085657B2

(12) United States Patent
Drossel

(10) Patent No.: US 7,085,657 B2
(45) Date of Patent: Aug. 1, 2006

(54) SIGNAL PROCESSING UNIT FOR A PRESSURE SWITCH OR THE LIKE

(75) Inventor: Detlef Drossel, Bielefeld (DE)

(73) Assignee: Parker Hannifin GmbH, Bielefeld (DE)

(*) Notice: Subject to any disclaimer, the term of this patent is extended or adjusted under 35 U.S.C. 154(b) by 401 days.

(21) Appl. No.: 10/305,746

(22) Filed: Nov. 26, 2002

(65) Prior Publication Data

US 2003/0107509 A1 Jun. 12, 2003

(30) Foreign Application Priority Data

Dec. 11, 2001 (DE) ................. 101 60 794

(51) Int. Cl.
*G01R 19/00* (2006.01)
(52) U.S. Cl. .................. 702/50; 702/64; 702/65
(58) Field of Classification Search .............. 702/57, 702/138, 189, 50, 64–66, 106, 107, 139; 330/9; 327/124
See application file for complete search history.

(56) References Cited

U.S. PATENT DOCUMENTS

| 3,960,010 | A | | 6/1976 | Gustafsson | 324/610 |
| 4,862,382 | A | | 8/1989 | Schneider et al. | 327/101 |
| 5,228,337 | A | * | 7/1993 | Sharpe et al. | 73/146.5 |
| 5,233,867 | A | | 8/1993 | Richardson et al. | 73/186 |
| 5,681,997 | A | | 10/1997 | McHale et al. | 73/727 |
| 5,844,427 | A | * | 12/1998 | Theus et al. | 327/51 |
| 6,002,299 | A | * | 12/1999 | Thomsen | 330/9 |
| 6,223,138 | B1 | | 4/2001 | Raffius et al. | 702/189 |
| 6,259,259 | B1 | * | 7/2001 | Raffalt et al. | 324/650 |
| 2003/0102909 | A1 | * | 6/2003 | Motz | 330/9 |

FOREIGN PATENT DOCUMENTS

| EP | 0 590 292 A2 | 4/1994 |
| EP | 0 857 957 A1 | 8/1998 |

OTHER PUBLICATIONS

Parker Fluid Connectors Datasheet SCPSD/UK for Electric Pressure Switch SCPSD, published more than one year before the filing date of the subject application.
European Search Report regarding Application No. 02 02 6737 dated Jun. 1, 2005.

* cited by examiner

*Primary Examiner*—Carol S. W. Tsai
*Assistant Examiner*—Anthony Gutierrez
(74) *Attorney, Agent, or Firm*—Christopher H. Hunter

(57) ABSTRACT

A signal processing unit for a pressure switch or the like, comprising a sensor element, such as a strain gauge bridge, to supply an analog electrical signal that corresponds to a pressure; a signal processing unit which is connected downstream of the sensor element to amplify and digitize the analog signal; and a control unit for electrical switches which is connected downstream of the signal processing unit to switch external loads or the like. According to the invention, the signal processing unit comprises a chopper amplifier, which switches or balances the polarity of the analog electrical signal present at its input and supplied by the sensor element, and the amplified analog electrical or digitized signal present at its output, at the same clock rate.

15 Claims, 2 Drawing Sheets

SIGNAL PROCESSING UNIT FOR A PRESSURE SWITCH OR THE LIKE

RELATED CASES

Figure 1:
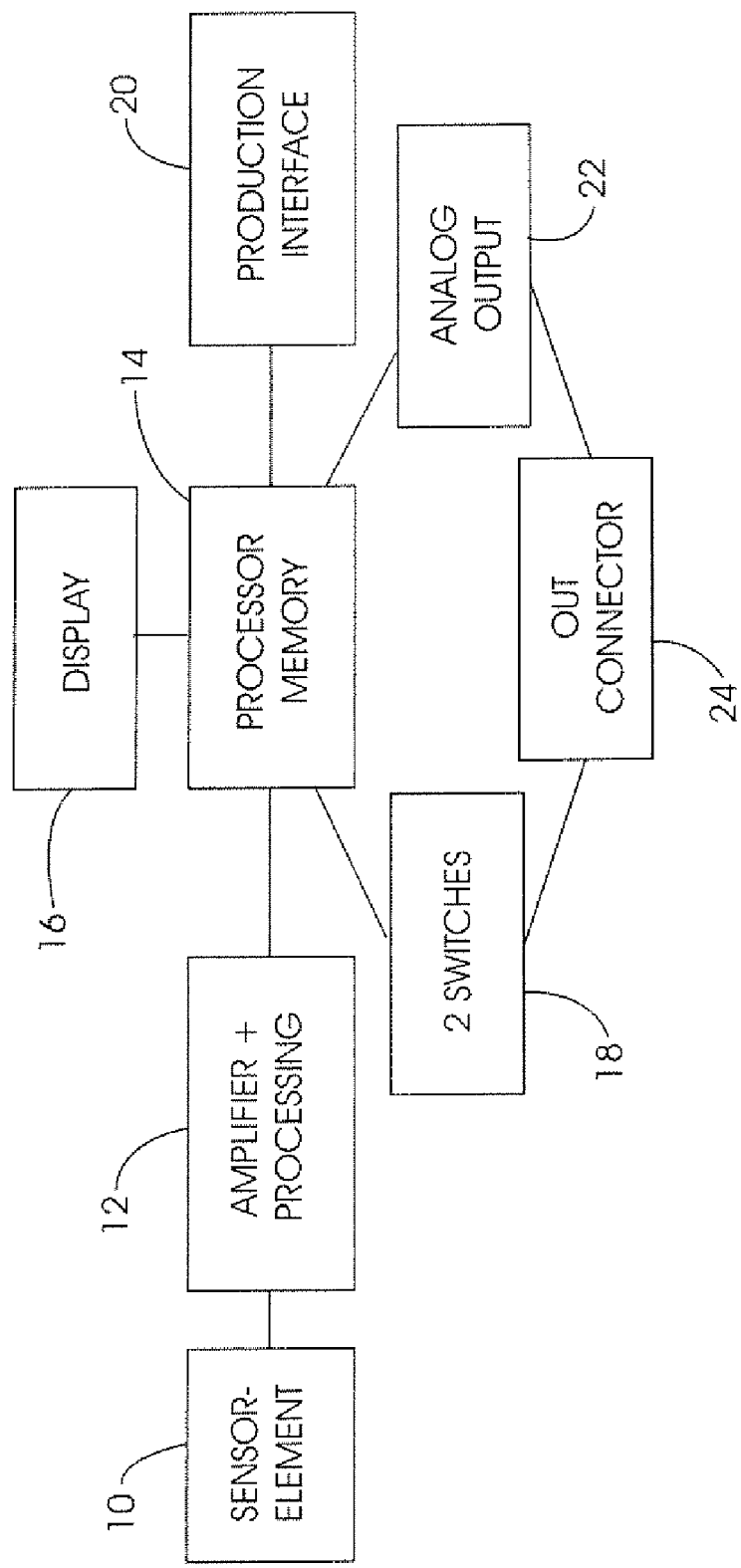

The present application claims priority to German Patent Application Serial No. DE 101 60 794.6; filed Dec. 11, 2001.

DESCRIPTION

The invention relates to a signal processing unit for a pressure switch or the like. A pressure switch is used in fault detection, control or monitoring systems in which rapid pressure-dependent switching signals or analog signals are required. Such a pressure switch comprises a sensor element, such as a pressure sensor, to supply an analog electrical signal that corresponds to a pressure or the like; a signal processing unit which is connected downstream of the sensor element to amplify and digitize the analog signal; and a control unit for electrical switches which is arranged downstream of the signal processing unit to switch external loads or the like. The known configuration permits a compact design, long service life and is suitable for permanent series use in hydraulic and pneumatic applications.

A pressure switch having a signal processing unit is available from Parker Hannifin GmbH, Hydraulic Controls Division, Kaarst Germany, under the designation "Electronic Pressure Switch Series SCPSD".

Pressure in such systems is preferably recorded with piezoresistive measuring cells, which have sufficient zero point and long-term stability for many applications. The known arrangement has two mutually independent programmable switch outputs and one freely programmable analog output for connection with electrical controls. Each switch output has two pressure switching points with which the ON and OFF pressures can be freely set (variable hysteresis). Due to variably adjustable delay times, undesirable pressure peaks. of short duration or high frequency can also be filtered out (damping). The switch outputs are switched as normally closed or normally open contacts according to the set switching points, hysteresis or window functions and are indicated via the status display. Any functional error can be signaled via a digital display arrangement and taken into account during further processing. The electronics can be fully encapsulated to make them moisture-proof and vibration-resistant. The known signal processing unit can be used in machine tools, injection molding machines, as well as for applications in compressor engineering, hydraulic and pneumatic systems engineering, mechanical engineering, pump engineering, press engineering and process technology.

The arrangement can be used for fast ON-OFF control as well as for continuous pressure monitoring in filters, pumps, compressors, accumulators, hydraulic and pneumatic machines and units, and for decentralized visualization of machine parameters, such as pressure and peak pressure.

An analog output of a few mA is suitable for connecting to analog evaluation units, including analog control units, information equipment and personal computers.

The bridge signal of the piezoresistive measuring cell used in the known arrangement has a rating of approximately 100 mV. This relatively large signal can be amplified with a simple instrument amplifier. If a pressure switch using a different measuring cell, e.g. a strain gauge, or a ceramic element is employed, the rating is only approximately 10 mV. For such a small signal, a simple, inexpensive amplifier is no longer sufficient, since any temperature change changes the measured signal to an unallowable extent.

An ideal amplifier should amplify only the input signal, i.e. the output should be equal to the input multiplied by the amplification. A real amplifier has several errors: offset drift (even at 0 volt an output voltage occurs at the input, which is a function of temperature and aging, among other things); thermoelectric voltages (also a function of temperature); voltages due to line impedances; and noise at the output (particularly at low frequencies).

The better the amplifier used, the smaller these errors become, but the more expensive the amplifier will be.

To process such small signals, as indicated above, therefor requires precise and expensive amplifier. This is a drawback.

The object of the invention is to eliminate, in particular, the aforementioned low-frequency or DC voltage interference from the signal of a signal processing unit provided for a pressure sensor/pressure switch, temperature sensor/temperature switch or a force sensor/force switch or the like, each with electrical analog and/or digital output (bus output).

"Sensor" or "sensor element" in this case is defined as an "electronic signal-transmitting element" that converts a physical value, such as pressure, temperature, or force, into an electronic signal, which is output as an analog or digital signal.

The display device is correspondingly provided for displaying an analog signal supplied on a single line, or a digital signal supplied on a multiple line (bus line).

This object is attained by a signal processing unit that comprises a chopper amplifier which switches or balances the polarity of the analog electrical signal present at its input supplied by the sensor element and the amplified analog electrical or digitized signal present at its output at the same clock rate.

This makes it possible to cut out the low frequency or DC voltage interference.

Since the polarity of the measuring signal is switched at the amplifier input and at the amplifier output at the same clock rate in two phases, the two signals of the same polarities are subtracted during analysis. Expressed in formulas:

Phase1: Output voltage1 =
　　　　input voltage ∗ amplification + interference voltage Phase2: Output voltage2 =
　　　　−input voltage ∗ amplification + interference voltage Result = output voltage1 − output voltage2

Subtraction = 2 ∗ input voltage ∗ amplification +
　　　　interference voltage − interference voltage
　　　　= 2 ∗ input voltage ∗ amplification The aforementioned interference voltage occurring in the amplifier is thus canceled out.

The function of the described chopper amplifier can be implemented in different ways. It is particularly advantageous if the sensor element is configured as a measuring bridge and the switching of the polarity at the input of the chopper amplifier is obtained by supplying a square wave AC voltage as the supply or input voltage to the measuring bridge at the clock frequency.

Instead of the measuring bridge, a measuring resistor may be sufficient.

It is also advantageous if the bridge output signal is supplied to a circuit which comprises two operational amplifiers, two inputs, and two outputs and which is configured in such a way that it supplies at its two outputs a voltage with a magnitude corresponding to the measured quantity sensed by the sensor element, e.g. pressure.

It is also advantageous if the two outputs are connected upstream of an analog/digital converter, which alternately samples the two voltages and converts them into numerical values and thereby facilitates the subtraction of the two values in a unit connected downstream of its output.

The switching clock can advantageously be generated in a microcontroller unit.

It is particularly advantageous if the subtraction is controlled and/or performed in the microcontroller unit.

Figure 2:
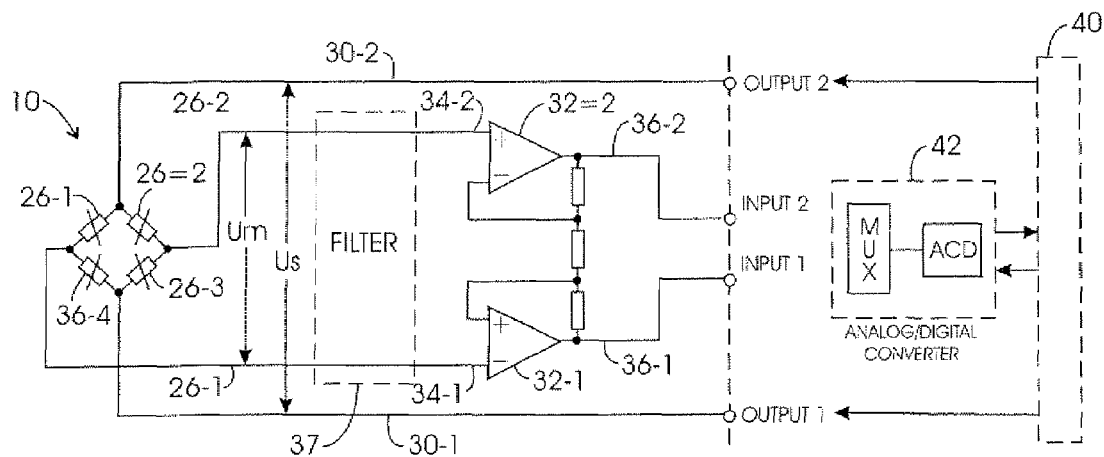
Figure 3:
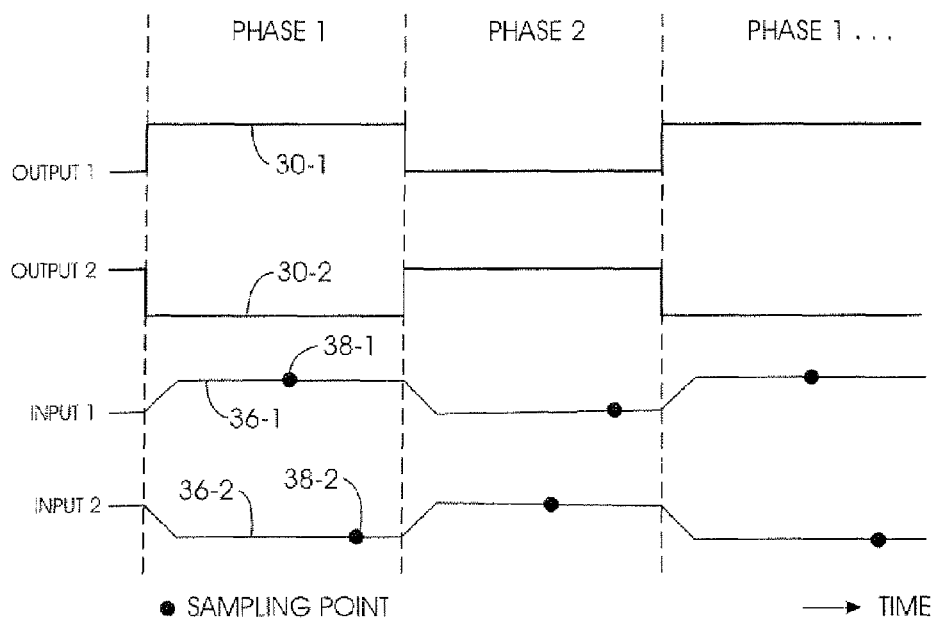

The invention will now be described in greater detail, by way of example, with reference to the embodiments depicted in the drawing in which FIG. 1 is a block diagram of an arrangement for controlling pressure switches in which the inventive arrangement can be used, FIG. 2 is a block diagram of the inventive arrangement, and FIG. 3 is a timing diagram of the voltages of the block diagram depicted in FIG. 2.

The block diagram according to FIG. 1 shows a sensor element 10, such as a piezoresistive pressure sensor, a strain gauge, or a ceramic sensor element, each supplying an analog electrical signal corresponding to a pressure or the like. A signal processing unit 12 is connected downstream of the sensor element, in which the signal of the sensor element is received, amplified and/or processed and at the same time digitized. A control unit 14 downstream of this block 12 comprises, for instance, a processor and memory for this digital data, as well as a further digital component, e.g. for a display unit, such as a digital display 16, as well as other digital components to control one or more switches 18, a production interface 20, and an analog output 22. According to FIG. 1, an out-connector 24 may originate from the analog output 22 as well as from switches 18 to facilitate contacting with other equipment.

The signal processing unit 12 according to FIG. 1 comprises a chopper amplifier, which will now be described in greater detail with reference to FIG. 2. A chopper amplifier operates in such a way that the polarity of the analog electrical signal, which is present at its input and corresponds, for instance, to a measured value, and the amplified analog electrical or digitized signal, which is present at its output, are switched or balanced at the same clock rate. In the arrangement according to FIG 2, this is achieved by configuring the sensor element 10 as a measuring resistor or a measuring bridge comprising four measuring elements 26-1, 26-2, 26-3 and 26-4, which are interconnected in the form of a bridge and are made, for instance, of strain gauges or ceramic elements whose resistance changes with their extension or compression.

Applying a supply voltage to two opposite points of the measuring bridge, e.g. a supply voltage Us delivered by a microcontroller 40 via line 30-1 or 30-2 supplied via output 1 or output 2, causes currents flowing through the two branches of the measuring bridge consisting of elements 26-2, 26-3 or 26-1, 26-4, and corresponding voltage drops that can be detected at the junctions between elements 26-2 and 26-3 or 26-1 and 26-4, corresponding to lines 28-2 If the measuring bridge is balanced, the voltage drops are equal in magnitude and the measuring voltage value is 0V. If the bridge is imbalanced, e.g., through a pressure load or temperature change, a measuring voltage is created as a function of the imbalance between the two connecting lines 28-1 and 28-2. This is measuring voltage $U_m$.

This bridge output signal (if a simple resistor is used instead of a measuring bridge, the voltage drop at the resistor) is supplied to a circuit that comprises operational amplifiers 32-1 and 32-2, two inputs 34-1 and 34-2, and two outputs 36-1 and 36-2. This circuit is configured in such a way that at its two outputs 36-1 and 36-2 voltages 38-1, 38-2 are created according to FIG. 3, which change their polarity and have a magnitude that depends on the measured quantity sensed by the sensor elements, e.g. pressure.

The measuring bridge does not receive a DC voltage as the supply voltage but an AC voltage whose time characteristic is indicated at 30-1 and 30-2 in FIG. 3. In the first phase (phase 1 ) of a cycle time consisting of two phases, a negative square wave signal is supplied via line 30-2 (output 2 ), and a positive signal via line 30-1 (output 1 ). In the second phase (phase 2 ) the conditions are reversed. This results in a supply voltage $U_s$ at the bridge that is twice as high and has also a square wave shape. This voltage causes a corresponding square wave shape of the bridge voltage that occurs in case of an imbalance of the bridge, or a measuring voltage $U_m$, which is supplied over lines 28-1 and 28-2, as shown in FIG. 2, optionally through a filter 37, to the outputs of the two operational amplifiers 32-1 and 32-2 connected back to back. Filter 37 eliminates, for instance, high-frequency interference signals.

The amplified voltage of the two operational amplifiers, which is output via lines 36-1 and 36-2, is then supplied to a block 42, which comprises a multiplexer MUX and an analog/digital converter ADC for time-shifted sampling of the two voltages and analog/digital conversion (see the two signals 36-1 and 36-2 with the sampling instants 38-1, 38-2 according to FIG. 3). From block 42, the sampling values reach microcontroller 40 for subtraction. This microcontroller 40 preferably also directly generates the AC voltage for the measuring bridge (see lines leading from microcontroller 40 to the measuring bridge identified as 30-1 and 30-2 ).

Thus, the same component is advantageously used to generate the switching clock, generate the AC voltage to supply the measuring bridge, and finally evaluate the bridge voltage supplied by the measuring bridge.

The above-described chopper principle makes it possible to eliminate in the evaluation unit both the offset drift due to the amplifier (as a function of temperature and aging) and the low-frequency noise, as well as to eliminate or reduce the other errors described.

This eliminates the necessity for precise and thus expensive amplifiers; instead, standard, inexpensive operational amplifiers may be used.

Since the subtraction takes place in the numerical processor (part of component 40), no additional hardware is required for this purpose. This provides a cost-effective solution and avoids additional errors in subtraction.

In addition to the amplifier errors, some externally injected errors are also suppressed and EMC (electromagnetic compatibility) is consequently improved. This eliminates EMC measures and thereby lowers the costs.

The described simple configuration of the circuit with the numerical subtraction in microcontroller 40 applies to sensors irrespective of the quantities to be measured. Other signal processing may thus be performed after this subtraction.

The simple configuration of the circuit with the direct supply of the sensor elements from the microcontroller also applies to sensors of all types, irrespective of the quantities to be measured.

The inventive chopper amplifier can have a configuration such that phase switching takes place either in front of the sensor element (e.g. by means of switching the supply voltage) or behind the sensor element (e.g. by switching its output signal). The measuring signal thus clocked is then filtered and amplified.

Phase switching of the amplifier output signal and averaging can be done with respect to the analog value, i.e. before or after the analog/digital converter.

Another possible configuration of the chopper amplifier is the following: pressure sensor element—phase switching input—filter—amplifier—phase switching output (software-implemented)—analog/digital converter—averaging (software).

The invention claimed is:

1. A pressure switch comprising:
   i) a sensor element to supply an analog electrical signal corresponding to a pressure,
   ii) a signal processing unit which is connected downstream of the sensor element to amplify the analog electrical signal, and
   iii) a control unit for electrical switches which is connected downstream of the signal processing unit for switching external loads, for a display unit, for production interfaces and the like,
   wherein the signal processing unit comprises a chopper amplifier, which switches or balances the polarity of the analog electrical signal present at an input to the signal processing unit supplied by the sensor element, and the analog electrical signal present at an output of the signal processing unit, at the same clock rate,
   the output of the signal processing unit supplies a voltage with a magnitude corresponding to a measured quantity sensed by the sensor, and
   the output of the signal processing unit is connected upstream of an analog/digital converter which samples the voltage in a first phase and a second phase and converts them into numerical values and enables subtraction of the two values in a unit connected downstream the converter output.

2. The pressure switch as in claim 1, wherein the sensor element comprises a measuring resistor or a measuring bridge, such that the switching of the polarity of the signal present at the input of the chopper amplifier is obtained by supplying a square wave AC voltage as the supply voltage to the measuring resistor or the measuring bridge at the clock rate.

3. The pressure switch as in claim 2, where the sensor element output signal is supplied to the signal processing unit which comprises two operational amplifiers, two inputs, and two outputs representing the output of the signal of the signal processing unit, and which is configured in such a way that at each of the two outputs the signal processing unit supplies a voltage with a magnitude corresponding to a measured quantity sensed by the sensor element.

4. The pressure switch as in claim 3, wherein the two outputs are connected upstream of the analog/digital converter, which alternately samples the two voltages in each of the first phase and the second phase and converts them into numerical values and enables a subtraction of the two values in the unit connected downstream of the converter output.

5. The pressure switch as in claim 4, wherein the unit connected downstream of the converter output comprises a microcontroller unit which includes a switching clock to generate the clock rate.

6. The pressure switch as in claim 5, wherein the subtraction is controlled and/or is performed by the microcontroller unit.

7. The pressure switch as in claim 6, wherein the supply voltage for the measuring resistor or the measuring bridge is supplied by the microcontroller unit.

8. An electronic switch means including:
   i) a sensor element to supply an analog electrical signal corresponding to a measured quantity;
   ii) signal processing means connected downstream of the sensor element to amplify the analog electrical signal, and
   iii) control means connected downstream of the signal processing means to interface with external electrical components;
   the signal processing means comprising a chopper amplifier, which switches or balances the polarity of the signal supplied to an input to the signal processing means by the sensor element, and the signal provided at an output of the signal processing means, at the same clock rate,
   the output of the signal processing means supplies a voltage with a magnitude corresponding to a measured quantity sensed by the sensor element, and
   the output of the signal processing means is connected upstream of an analog/digital converter which samples the voltage in a first chase and a second chase and converts them into numerical values and enables subtraction of the two values in a unit connected downstream the converter output.

9. The electronic switch means as in claim 8, wherein the sensor element comprises electronic measuring means, and switching of the polarity of the signal present at the input of the chopper amplifier is obtained by supplying a square wave AC voltage as the supply voltage to the measuring means at the clock rate.

10. The electronic switch means as in claim 9, where the electronic measuring means provides an output signal which is supplied to the signal processing means which comprises two operational amplifiers, two inputs, and two outputs representing the output of the signal processing means, and which is configured in such a way that at each of the two outputs, the signal processing means supplies a voltage with a magnitude corresponding to the measured quantity sensed by the sensor element.

11. The electronic switch means as in claim 10, wherein the two outputs are connected upstream of the analog/digital converter, which converter alternately samples the two voltages in each of the first phase and the second phase and converts them into numerical values and enables a subtraction of the two values in the unit connected downstream of the converter.

12. The electronic switch means as in claim 11, wherein the unit comprises a microcontroller, which includes a switching clock to generate the clock rate.

13. The electronic switch means as in claim 12, wherein the microcontroller includes means to perform the subtraction of the two values.

14. The electronic switch means as in claim 13, wherein the microcontroller includes means to supply the supply voltage to the electronic measuring means.

15. The electronic switch means as in claim 8, further including external electronic components connected downstream of the control means consisting of at least one of i) a display unit; ii) switches; iii) out connectors; and iv) production interfaces.

* * * * *